(12) United States Patent
Lee et al.

(10) Patent No.: US 10,293,767 B2
(45) Date of Patent: May 21, 2019

(54) APPARATUS AND METHOD FOR CONTROLLING POWER OF VEHICLE

(71) Applicant: HYUNDAI MOTOR COMPANY, Seoul (KR)

(72) Inventors: Young Il Lee, Gunpo-si (KR); Jung Hyeon Bae, Suwon-si (KR); Tae Hoon Kim, Seoul (KR); Eun Cheon, Seognam-si (KR); Guy Championnet, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 173 days.

(21) Appl. No.: 15/333,717

(22) Filed: Oct. 25, 2016

(65) Prior Publication Data

US 2018/0009400 A1    Jan. 11, 2018

(30) Foreign Application Priority Data

Jul. 8, 2016 (KR) .................. 10-2016-0087006

(51) Int. Cl.
*B60R 16/03* (2006.01)

(52) U.S. Cl.
CPC .................. *B60R 16/03* (2013.01)

(58) Field of Classification Search
None
See application file for complete search history.

(56) References Cited

U.S. PATENT DOCUMENTS

| 8,996,284 B2 | 3/2015 | Polimeno et al. |
| 2011/0187184 A1* | 8/2011 | Ichikawa ............... B60L 1/003 307/10.1 |
| 2013/0300192 A1 | 11/2013 | Inaba et al. |
| 2015/0307041 A1 | 10/2015 | Hirano |

FOREIGN PATENT DOCUMENTS

| DE | 102012015921 A1 | 2/2014 |
| EP | 2111683 B1 | 9/2010 |
| JP | H06-124720 A | 5/1994 |

(Continued)

OTHER PUBLICATIONS

Korean Office Action issued in corresponding Korean Patent Application No. 2016-0087006, dated Aug. 16, 2017.

*Primary Examiner* — Thienvu V Tran
*Assistant Examiner* — David M Stables
(74) *Attorney, Agent, or Firm* — Morgan Lewis & Bockius LLP

(57) ABSTRACT

There are provided an apparatus and a method for controlling power of a vehicle. The apparatus for controlling power of a vehicle includes: a first load and a second load; a first power supply supplying power to at least one of the first load and the second load from a main battery; a second power supply supplying power to at least one of the first load and the second load from an auxiliary battery supplied with and charged by the power from the main battery; a switch set including a plurality of switches intermitting lines between the first load, the second load, the first power supply, and the second power supply; and a power controller checking a state of the vehicle and controlling a turn-on or off for the plurality of switches in response to the checked state of the vehicle.

15 Claims, 8 Drawing Sheets

(56) References Cited

FOREIGN PATENT DOCUMENTS

| | | |
|---|---|---|
| JP | 4650305 B2 | 3/2011 |
| JP | 2014-184752 A | 10/2014 |
| JP | 2015-196447 A | 11/2015 |
| KR | 10-1116161 B1 | 3/2012 |
| KR | 10-20150080559 A | 7/2015 |

* cited by examiner

APPARATUS AND METHOD FOR CONTROLLING POWER OF VEHICLE

CROSS-REFERENCE TO RELATED APPLICATION

This application is based on and claims the benefit of priority to Korean Patent Application No. 10-2016-0087006, filed on Jul. 8, 2016 in the Korean Intellectual Property Office, the disclosure of which is incorporated herein in its entirety by reference.

TECHNICAL FIELD

The present disclosure relates to an apparatus and a method for controlling power of a vehicle.

BACKGROUND

A vehicle has a great number of electronic units, and as a system related to a vehicle control is recently increased, the number of electronic units included in the vehicle is also largely increased.

As such, in the case in which the number of electronic units in the vehicle is largely increased, the number of wires connecting the respective electronic units to each other and/or a length thereof is also increased. As a result, internal complexity of a vehicle body is largely increased and weight of the vehicle body is also increased.

In addition, in the case in which the number of electronic units of the vehicle is largely increased, as electricity consumption by a number of electronic units is increased, capacity of an alternator and a battery faces limitations. Moreover, as power consumption is increased, an electrical accident such as a short circuit, or the like due to an over-voltage and/or watertight may occur. Furthermore, quality of the electronic unit may be deteriorated due to a voltage drop. In particular, as the electricity consumption of the vehicle is increased, fuel efficiency may also be significantly deteriorated.

Due to these reasons, as the number of electronic units of the vehicle is increased, reliability of a vehicle may be significantly deteriorated by an occurrence of an accident, or the like.

SUMMARY

The present disclosure has been made to solve the above-mentioned problems occurring in the prior art while advantages achieved by the prior art are maintained intact.

An aspect of the present disclosure provides an apparatus and a method for controlling power of a vehicle capable of preventing an accident and increasing fuel efficiency by controlling a power distribution depending on a vehicle state.

According to an exemplary embodiment of the present disclosure, an apparatus for controlling power of a vehicle includes: a first load and a second load; a first power supply supplying power to at least one of the first load and the second load from a main battery; a second power supply supplying power to at least one of the first load and the second load from an auxiliary battery supplied with and charged by the power from the main battery; a switch set including a plurality of switches intermitting lines between the first load, the second load, the first power supply, and the second power supply; and a power controller checking a state of the vehicle and controlling a turn-on or off for the plurality of switches in response to the checked state of the vehicle.

According to another exemplary embodiment of the present disclosure, a method for controlling power of a vehicle includes: checking a state of the vehicle; and controlling a turn-on or off for a plurality of switches intermitting lines between a first power supply supplying power to at least one of a first load and a second load from the first load, the second load, and a main battery in response to the checked state of the vehicle, and a second power supply supplying power to at least one of the first load and the second load from an auxiliary battery supplied with and charged by the power from the main battery.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
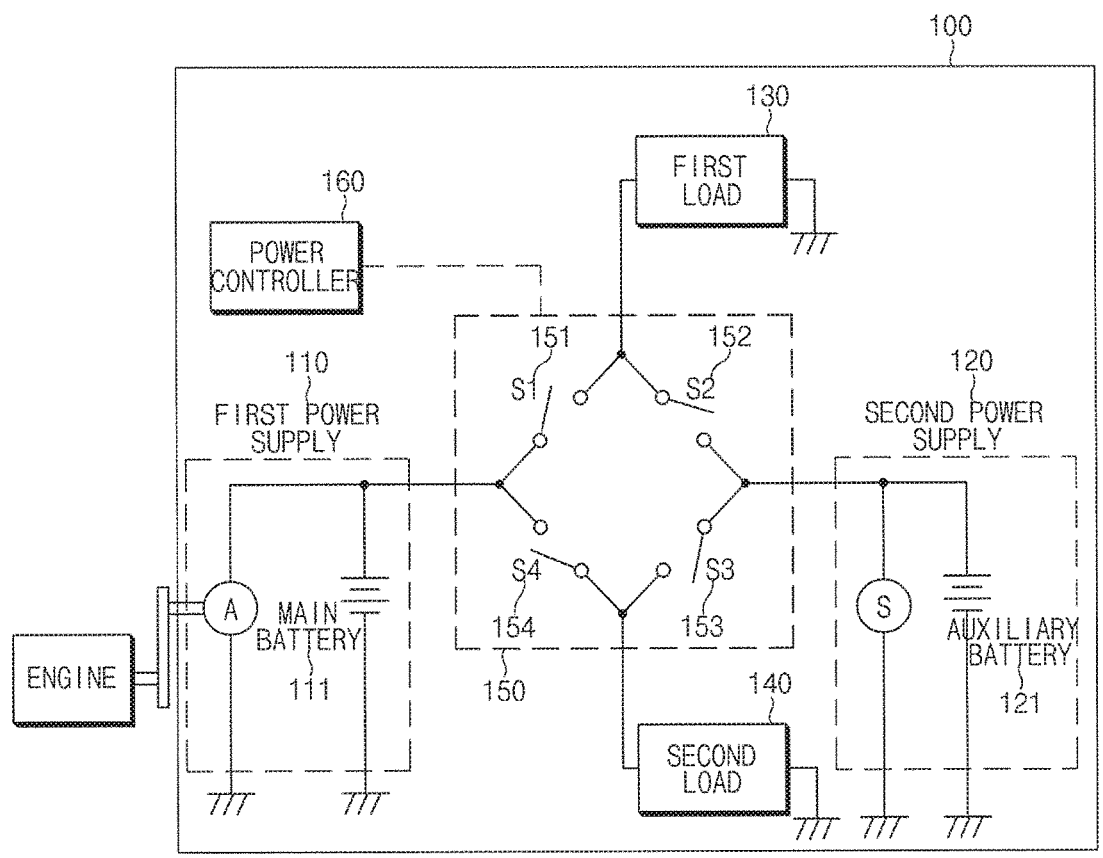
FIG. 1 is a diagram illustrating a configuration of an apparatus for controlling power of a vehicle according to an embodiment of the present disclosure.

It is to be noted that technical terms used in the specification are used for describing specific embodiments and do not limit the present disclosure. In addition, unless indicated otherwise in the present disclosure, it is to be understood that all the technical terms used in the present disclosure are construed as meaning as those that are generally understood by those who skilled in the art and are not construed as excessively comprehensive meanings and excessively reduced meanings. In addition, when the technical terms used in the present disclosure are not well-recognized technical terms that do not accurately indicate the technical spirit of the present disclosure, it is to be understood that the terms are replaced with the technical terms understood by those skilled in the art. Further, the general terms used in the present disclosure must be understood according to the meanings defined by the dictionary or the context and should not be excessively reduced meanings.

In addition, singular forms used in the present disclosure are intended to include plural forms unless the context clearly indicates otherwise. In the present disclosure, it is to be noted that the terms "comprising" or "including", and the like, are not be construed as necessarily including several components or several steps described in the present disclosure and some of the above components or steps may not be included or additional components or steps are construed as being further included.

In addition, terms including an ordinal number such as first, second, or the like, used in the present disclosure may be used to describe components. However, these components are not limited to these terms. The terms are only used to distinguish one component from another component. For example, the 'first' component may be named as the 'second' component, and vice versa, without departing from the scope of the present disclosure.

Hereinafter, exemplary embodiments of the present disclosure will be described in more detail with reference to the accompanying drawings. The same reference numerals will be used to describe the same or like components, independent of the reference numerals and an overlapped description of the same components will be omitted.

Further, when it is determined that the detailed description of the known art related to the present disclosure may obscure the gist of the present disclosure, the detailed description thereof will be omitted. In addition, it is to be noted that the accompanying drawings are provided only in order to allow the spirit of the present disclosure to be easily understood and is to be interpreted as limiting the spirit of the present disclosure.

FIG. 1 is a diagram illustrating a configuration of an apparatus for controlling power of a vehicle according to an embodiment of the present disclosure.

Referring to FIG. 1, the apparatus 100 for controlling power of a vehicle according to the present disclosure may include a first power supply 110, a second power supply 120, a first load 130, a second load 140, a switch set 150, and a power controller 160.

The first power supply 110 for supplying main power to the first load 130 and/or the second load 140 of the vehicle includes an internal combustion engine and a main battery 111. Here, the main battery 111, which is a chargeable/dischargeable electrical energy storage apparatus of a vehicle, may include a lead-acid battery, an AGM battery, a lithium ion battery, a super-capacitor, an electric double layer capacitor (EDLC), and a solar cell element.

The second power supply 120 for supplying auxiliary power to first load 130 and/or the second load 140 of the vehicle includes a starter circuit and an auxiliary battery 21. Here, the auxiliary battery 121, which is a chargeable/dischargeable electrical energy storage apparatus of a vehicle, may include a lead-acid battery, an AGM battery, a lithium ion battery, a super-capacitor, an electric double layer capacitor (EDLC), and a solar cell element. The auxiliary battery 121 may be charged with power supplied from the main battery 111 of the first power supply 110.

The first power supply 110 and the second power supply 120 may be connected to or disconnected from the first load 130 and/or the second load 140 by a control operation of each of switches included in the switch set 150. In addition, the first power supply 110 and the second power supply 120 may also be separated from each other by the control operation of the switch.

The first load 130 may include one or more standard consumers included in the vehicle. Meanwhile, the second load 140 may include one or more voltage sensitive consumers included in the vehicle.

Here, the voltage sensitive consumer means a load from which a voltage drop or a ripple may occur according to a specific test condition, a driving state of a vehicle, and a state of charge (SOC) of a battery, among loads in the vehicle. As an example, the voltage sensitive consumer may correspond to a cluster, an air-conditioner, a head unit, and an external amplifier in the vehicle, and loads having electrical characteristics similar to the respective loads.

The switch set 150 may include a plurality of switches. The plurality of switches may be disposed in a bridge (or ring) form. Each of the switches disposed in the bridge form has one end connected to the first power supply 110 or the second power supply 120, and the other end connected to the first load 130 or the second load 140. Here, each of the switches may be implemented in a semiconductor switch type such as a hardware switch, a software logic switch, a power metal oxide semiconductor field effect transistor (MOSFET), or the like. Of course, as long as the switch implements a switching function, any switch may be applied.

Although an exemplary embodiment of the present disclosure describes a case in which the switch set 150 includes four switches, that is, a first switch 151, a second switch 152, a third switch 153, and a fourth switch 154, the number of switches is not limited thereto, but may be increased or decreased according to other exemplary embodiments. Here, one end of the first switch 151 is connected to one end of the second switch 152, the other end of the second switch 152 is connected to one end of the third switch 153, the other end of the third switch 153 is connected to one end of the fourth switch 154, and the other end of the fourth switch 154 is connected to the other end of the first switch 151, such that the bride form may be formed.

The switch set 150 having the bridge form implemented by the first switch 151 to the fourth switch 154 may have a terminal of the first power supply 110 connected between the first switch 151 and the fourth switch 154, and a terminal of the second power supply 120 connected between the second switch 152 and the third switch 153. In addition, the switch set 150 may have a terminal of the first load 130 connected between the first switch 151 and the second switch 152, and a terminal of the second load 140 connected between the third switch 153 and the fourth switch 154.

The respective switches included in the switch set 150 may be turned-on or off by a control of the power controller 160. In this case, the power controller 160 is connected to each of the switches included in the switch set 150 to check a state of the vehicle in real time, and controls the turn-on/off of each of the switches according to the checked state of the vehicle.

As an example, the power controller 160 may control the turn-on/off of each of the switches S1 to S4 according to the state of the vehicle as in the following Table 1.

As expressed in Table 1, the power controller 160 may control the turn-on/off of each of the switches according to an operation state of terminals of the vehicle, a state of an engine, a state of charge of a battery, an operation state of a battery, an option state of the second load 140, and the like.

As an example, the power controller 160 may control the turn-on/off of each of the switches to separate the first load 130 and the second load 140 from the second power supply 120 according to the state of the engine of the vehicle.

In addition, the power controller 160 may control the turn-on/off of each of the switches to separate the first load 130 and the second load 140 from the first power supply 110 or the second power supply 120 according to a state of the main battery 111 and/or the auxiliary battery 121 of the vehicle.

In addition, the power controller 160 may also control the turn-on/off of each of the switches according to option states set to electronic units of the vehicle.

Therefore, an operation of controlling each of the switches according to a state of the vehicle by the power controller 160 will be described in more detail with reference to FIGS. 2 to 7.

In a first example, the power controller 160 checks an operation state of terminals such as an engine of the vehicle, and the like.

In this case, if the terminals of the vehicle are in a turn-off state of an operation as in (A) of Table 1, the power controller 160 performs a control so that power is supplied to the first load 130 by the first power supply 110.

Figure 2:
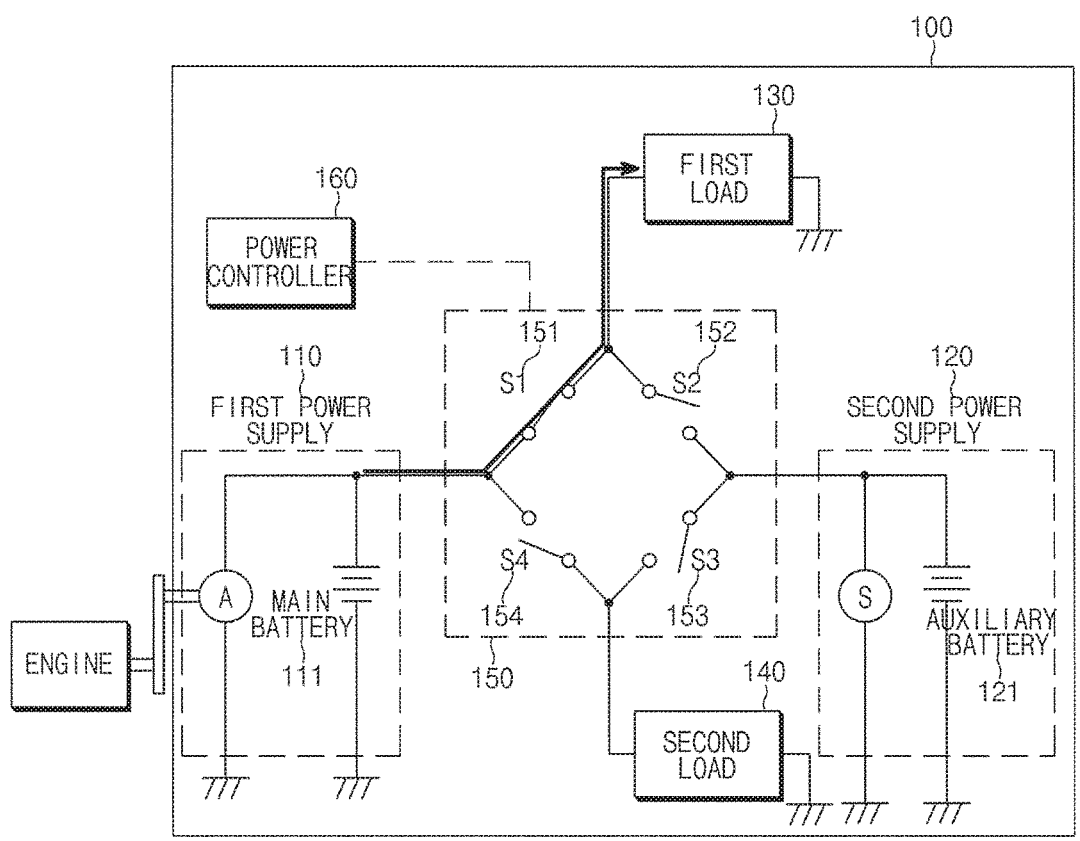
FIGS. 2 to 7 are diagrams illustrating operations of the apparatus for controlling power of a vehicle according to an embodiment of the present disclosure.

In this case, the power controller 160 controls only the first switch 151 connecting the first power supply 110 and the first load 130 to each other to be turned-on, and controls other switches to be turned-off as illustrated in FIG. 2.

In a second example, the power controller 160 checks an engine state of a vehicle in real time.

As a result of the check of the engine state of the vehicle, if the engine state of the vehicle is an engine cranking state by a cold start or a start mode operation as in (B) and (F) of Table 1, the power controller 160 performs a control so that the second power supply 120 is separated from the second load 140 by a voltage variation phenomenon of the second power supply 120.

Figure 3:
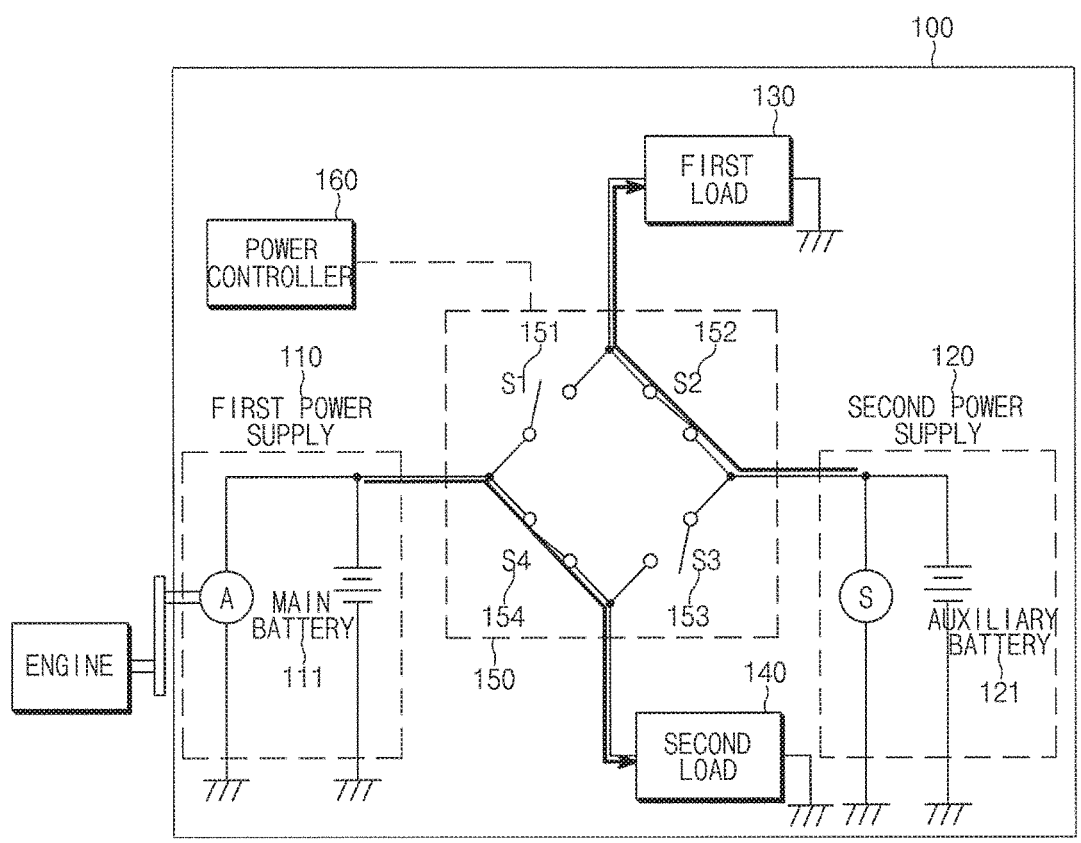

In this case, the power controller 160 controls the second switch 152 and the fourth switch 154 to be turned-on and controls the first switch 151 and the third switch 153 to be turned-off, as illustrated in FIG. 3, such that power of the first power supply 110 is supplied to the second load 140 and power of the second power supply 120 is supplied to the first load 130.

Meanwhile, in the case in which the vehicle is operated in a stop mode as in (E) of Table 1, the power controller 160 performs a control so that the second power supply 120 is separated from the first power supply 110.

Figure 4:
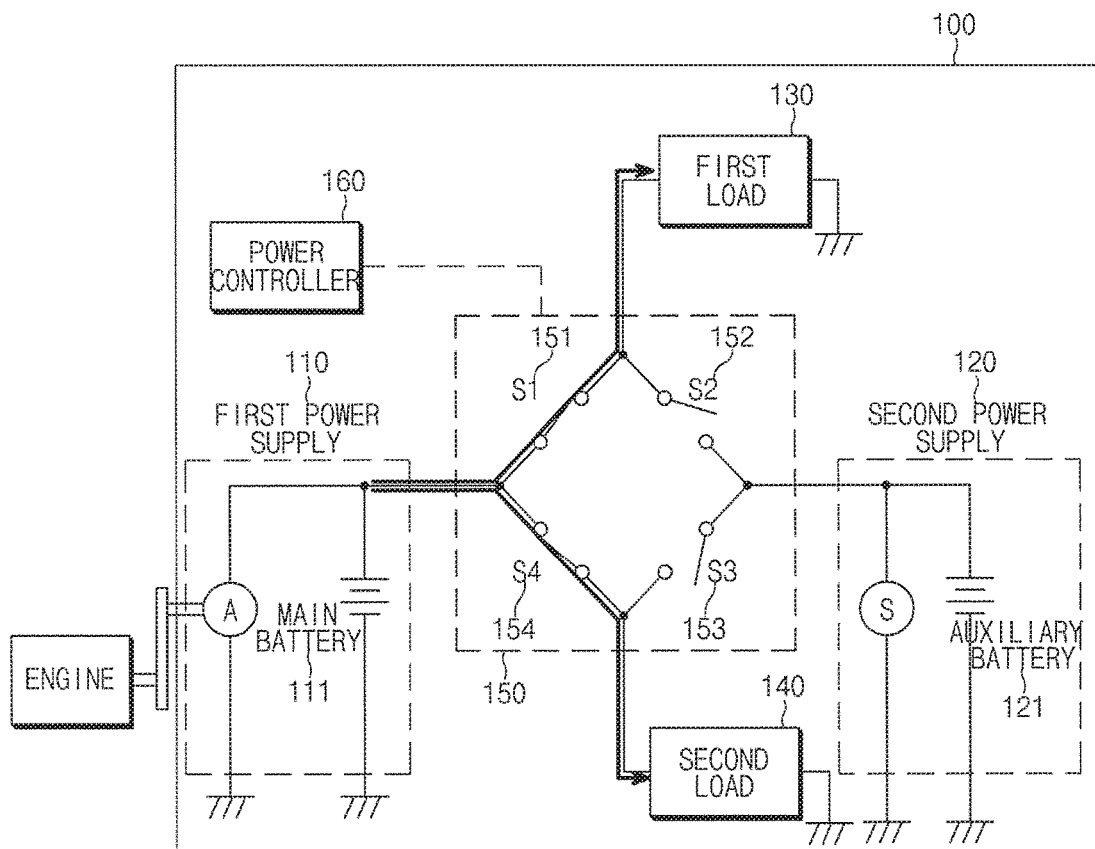

In this case, the power controller 160 controls the first switch 151 and the fourth switch 154 to be turned-on and controls the second switch 152 and the third switch 153 to be turned-off, as illustrated in FIG. 4, such that power of the first power supply 110 is supplied to the first load 130 and the second load 140, and the second power supply 120 is separated from the first load 130 and the second load 140.

In a third example, the power controller 160 checks a state of charge (SOC) of a battery of a vehicle in real time. In particular, the power controller 160 checks a state of charge (SOC) of an auxiliary battery of the second power supply 120.

In the case in which the SOC of the auxiliary battery of the vehicle is 70% or more, which satisfies an upper limit reference value, as in (C) of Table 1, the power controller 160 performs a control so that the second power supply 120 is separated from the first power supply 110.

In this case, the power controller 160 controls the first switch 151 and the fourth switch 154 to be turned-on and controls the second switch 152 and the third switch 153 to be turned-off, as illustrated in FIG. 4, such that power of the first power supply 110 is supplied to the first load 130 and the second load 140, and the second power supply 120 is separated from the first load 130 and the second load 140.

Meanwhile, in the case in which the SOC of the auxiliary battery of the vehicle is 60% or less, which does not satisfy a lower limit reference value as in (D) of Table 1, the power controller 160 performs a control so that the first power supply 110 and the second power supply 120 are connected to each other to charge the second power supply 120.

Figure 5:
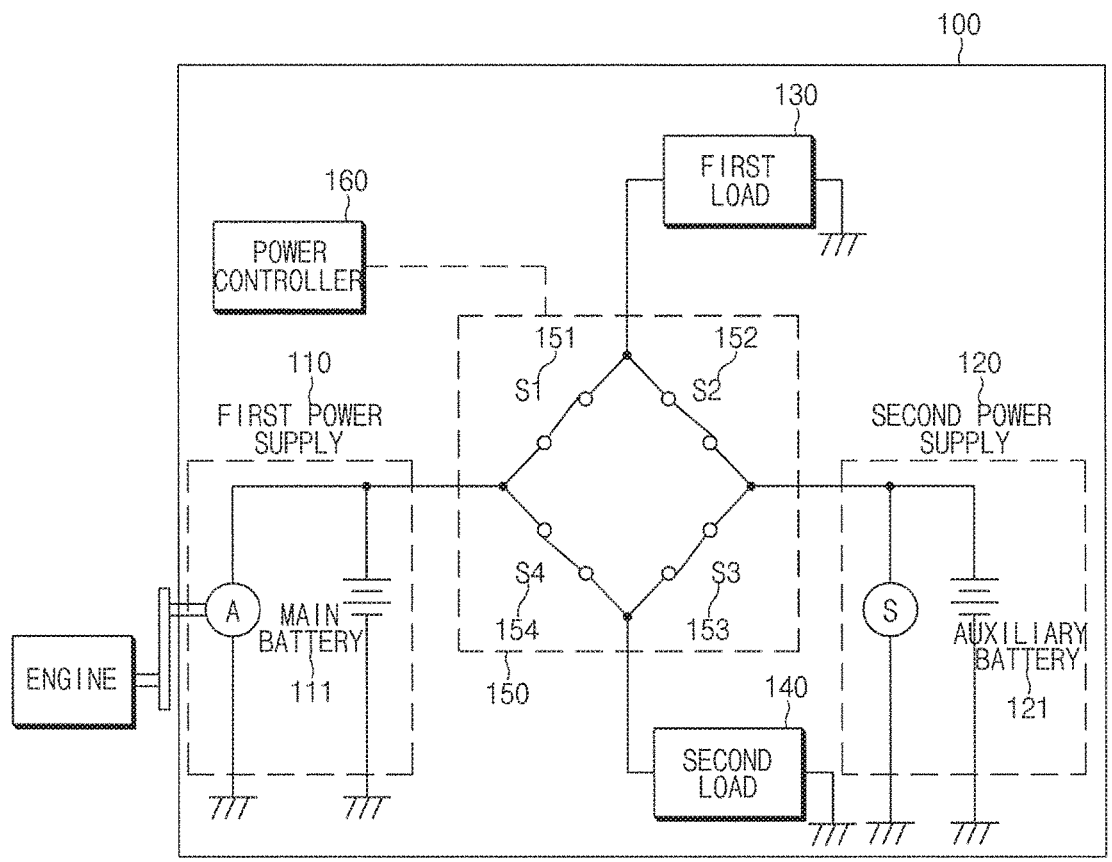

In this case, the power controller 160 controls overall switches, that is the first switch 151, the second switch 152, the third switch 153, and the fourth switch 154 to be turned-on, as illustrated in FIG. 5, such that the power of the first power supply 110 is supplied to the second power supply 120.

In a fourth example, the power controller 160 checks an operation state of a battery of a vehicle in real tune. In this case, the power controller 160 each checks operation states of the main battery 111 of the first power supply 110 and the auxiliary battery 121 of the second power supply 120.

In the case in which a fault occurs in the main battery 1 of the vehicle as in (G) of Table 1, the power controller 160 performs a control so that the first power supply 110 is separated from the first load 130 and the second load 140.

Figure 6:
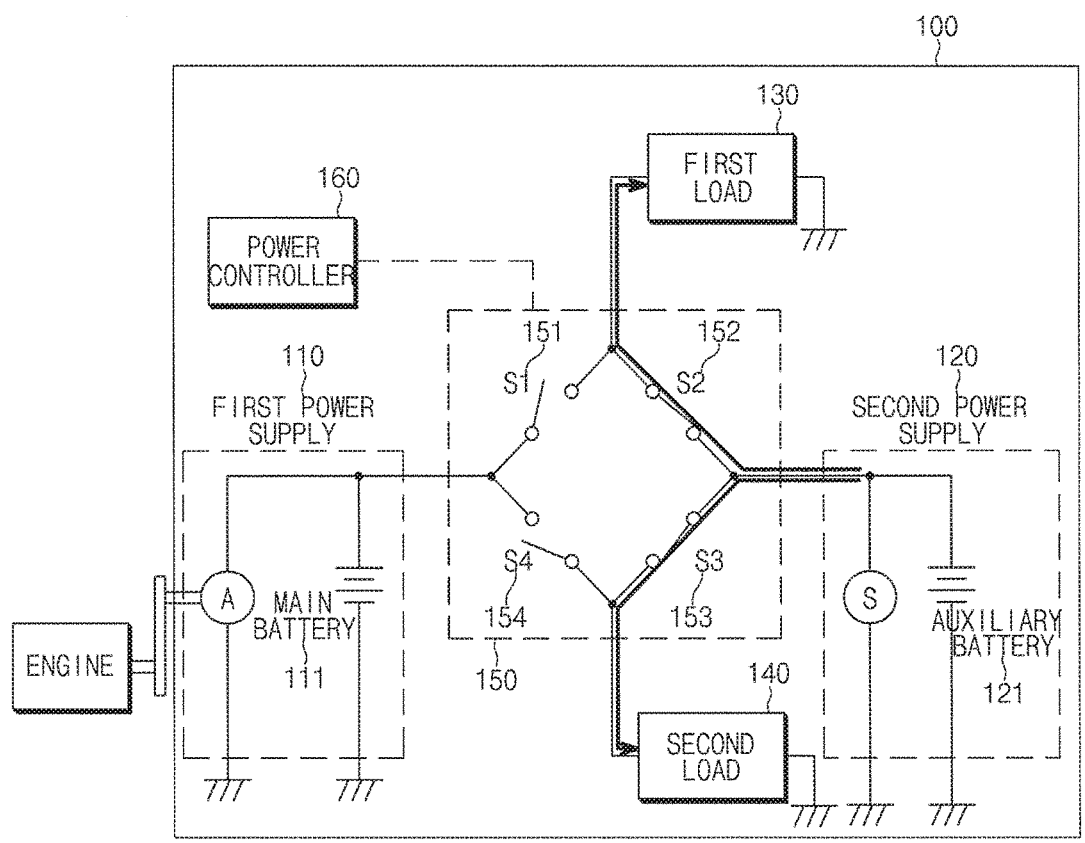

In this case, the power controller 160 controls the second switch 152 and the third switch 153 to be turned-on and controls the first switch 151 and the fourth switch 154 to be turned-off, as illustrated in FIG. 6, such that the power of the second power supply 120 is supplied to the first load 130 and the second load 140, and the first power supply 110 is separated from the first load 130 and the second load 140.

Meanwhile, in the case in which a fault occurs in the auxiliary battery 121 of the vehicle as in (H) of Table 1, the power controller 160 performs a control so that the second power supply 120 is separated from the first load 130 and the second load 140.

In this case, the power controller 160 controls the first switch 151 and the fourth switch 154 to be turned-on and controls the second switch 152 and the third switch 153 to be turned-off, as illustrated in FIG. 4, such that power of the first power supply 110 is supplied to the first load 130 and the second load 140, and the second power supply 120 is separated from the first load 130 and the second load 140.

In a fifth example, the power controller 160 checks an option state for the second load 140 of the vehicle. In this case, the power controller 160 may control a turn-on/off of the switch connected to the first power supply 110 and/or the second power supply 120 according to the option state of the second load 140.

In the case in which the turn-off is set to the second load 140, that is, the voltage sensitive consumer, as in (I) of Table 1, the power controller 160 performs a control so that the second load 140 is separated from the first power supply 110 and the second power supply 120.

Figure 7:
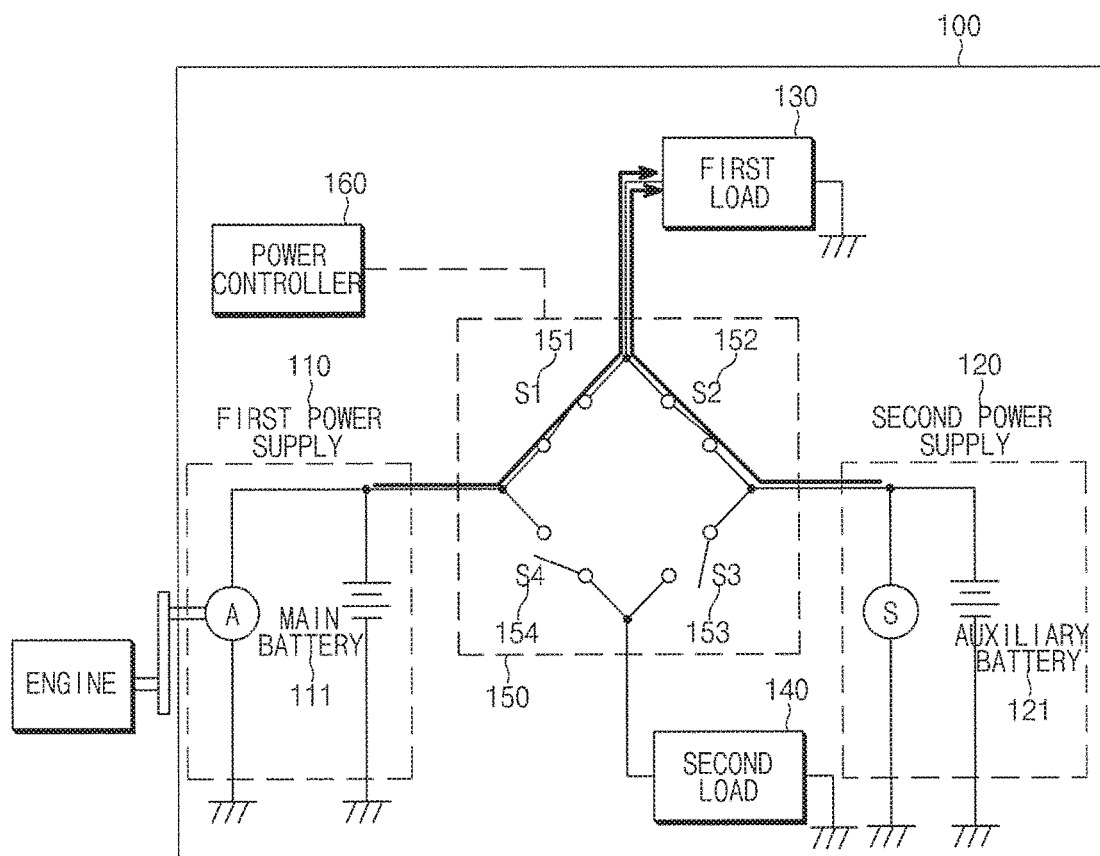

In this case, the power controller 160 controls the first switch 151 and the second switch 152 to be turned-on and controls the third switch 153 and the fourth switch 154 to be turned-off, as illustrated in FIG. 7, such that the power of the first power supply 110 and/or the second power supply 120 is not supplied to the second load 140 while maintaining the supplying of the power to the first load 130 through the first power supply 110 and/or the second power supply 120.

As described in the above-mentioned examples, the apparatus 100 for controlling power of a vehicle according to the present disclosure may stably supply the power to the load even in the case in which a rapid voltage drop or ripple occurs in a specific driving situation and prevent unnecessary consumption of energy by changing or separating a source of the power supplied to the first load 130 and/or the second load 140 according to the state of the vehicle.

The apparatus 100 for controlling power of a vehicle according to the present exemplary embodiment operated as described above may be implemented in the vehicle. Here, the apparatus 100 for controlling power of a vehicle may be formed integrally with internal controllers of the vehicle, and may also be implemented by an independent hardware apparatus to be connected to the controllers of the vehicle by a connection means. Meanwhile, the apparatus 100 for controlling power of a vehicle according to the present exemplary embodiment may be driven in a form included in other hardware apparatuses such as a microprocessor, a general purpose computer system, and the like, as one or more processors.

Here, the apparatus 100 for controlling power of a vehicle according to the present disclosure may be operated to be associated with sensors sensing states of an engine, a motor, and a state of the vehicle, and may also be operated to be associated with a controller controlling an operation of the engine or the motor.

An operation flow of the apparatus according to the present disclosure having the configuration as described above will be described below in more detail.

Figure 8:
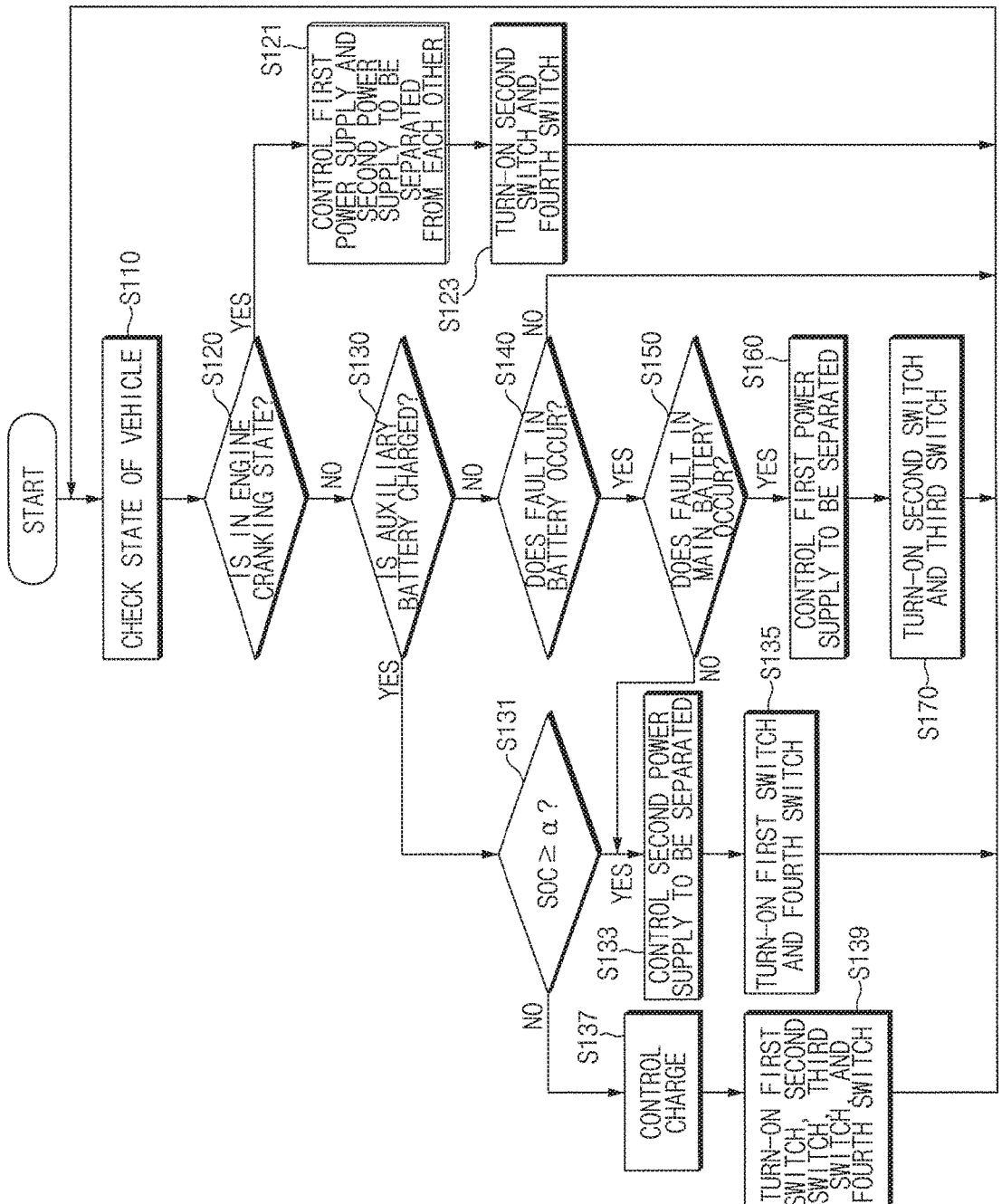
FIG. 8 is a diagram illustrating an operation flow of a method for controlling power of a vehicle according to an embodiment of the present disclosure.

FIG. 8 is a diagram illustrating an operation flow of a method for controlling power of a vehicle according to an embodiment of the present disclosure.

As illustrated in FIG. 8, the apparatus for controlling power of a vehicle checks a state of the vehicle in a start off state and/or a start on state (S110). In operation 'S110', the apparatus for controlling power of a vehicle may check a turn-on/off state of a terminal, an engine state, a state of charge of a battery, a fault state of the battery, and an option state of a voltage sensitive consumer.

As a result of the check of the state of the vehicle in operation 'S110', if the state of the vehicle is an engine cranking state (S120), the apparatus for controlling power of a vehicle controls a first power supply and a second power supply to be separated from each other (S121). To this end, the apparatus for controlling power of a vehicle controls a second switch and a fourth switch to be turned-on (S123).

As a result of the check of the state of the vehicle in operation 'S110', when an auxiliary battery is being charged (S130), if a state of charge (SOC) of the auxiliary battery is a reference value ($\alpha$) or more (S131), the apparatus for controlling power of a vehicle controls the second power supply to be separated (S131). To this end, the apparatus for controlling power of a vehicle controls a first switch and the fourth switch to be turned-on (S135).

Meanwhile, if the state of charge (SOC) of the auxiliary battery is not the reference value ($\alpha$) or more in operation 'S131, the apparatus for controlling power of a vehicle performs a charge control for the auxiliary battery (S137). To this end, the apparatus for controlling power of a vehicle controls the first switch, the second switch, a third switch, and the fourth switch to be turned-on (S139). Although it is illustrated in operation 'S137' that whether or not the state of charge (SOC) of the auxiliary battery is the reference value ($\alpha$) or more is determined, the apparatus for controlling power of a vehicle may also control so that operation 'S133' or 'S137' is performed according to whether or not a corresponding condition is satisfied, by separately setting an upper limit reference value and a lower limit reference value.

As a result of the check of the state of the vehicle in operation 'S110', if a fault in the battery occurs (S140), the apparatus for controlling power of a vehicle checks whether the fault is occurring in a main battery 111. If the fault is occurring the main battery (S150), the apparatus for controlling power of a vehicle controls the first power supply to be separated (S160). To this end, the apparatus for controlling power of a vehicle controls the second switch and the third switch to be turned-on (S170).

Meanwhile, if the fault is not occurring in the main battery in operation 'S150', the apparatus for controlling power of a vehicle determines that the fault occurs in the auxiliary battery and controls the second power supply to be separated (S131). To this end, the apparatus for controlling power of a vehicle controls a first switch and the fourth switch to be turned-on (S135).

Although FIG. 8 illustrates operations of controlling the switches according to some states of the vehicle, the switches may also be controlled according to other conditions.

The above-mentioned operations may be directly implemented by hardware and software module executed by a processor, or a combination of two. The software module may be resided on a storing medium (i.e., a memory and/or a storage) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM). An illustrative storing medium may be coupled to the processor and the processor may read information from the storing medium and write the information into the storing medium. Alternatively, the storing medium may be integral with the processor. The processor and the storing medium may also be resided within an application specific integrated circuit (ASIC). The ASIC may also be resided within a user terminal. Alternatively, the processor and the storing medium may also be resided within the user terminal as an individual component.

As described above, according to the exemplary embodiments of the present disclosure, an accident may be prevented and the fuel efficiency may be increased by controlling a power distribution depending on a vehicle state.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling power of a vehicle, the apparatus comprising:
    a first load and a second load;
    a first power supply supplying power to at least one of the first load and the second load from a main battery;
    a second power supply supplying power to at least one of the first load and the second load from an auxiliary battery supplied with and charged by the power from the main battery;
    a switch set including a plurality of switches intermitting lines between the first load, the second load, the first power supply, and the second power supply; and
    a power controller checking a state of the vehicle and controlling a turn-on or a turn-off for the plurality of switches in response to the checked state of the vehicle,
    wherein in response to the checked state that an operation state of the auxiliary battery confirms a fault occurring in the auxiliary battery, the power controller separates the second power supply from the first load and the second load and controls the plurality of switches so that the power of the second power supply is blocked from being supplied to the first load and the second load.

2. The apparatus according to claim 1, wherein in response to the checked state that a state of charge of the auxiliary battery is an upper limit reference value or more, the power controller separates the second power supply from the first power supply and controls the plurality of switches so that the power of the first power supply is not supplied to the second power supply.

3. The apparatus according to claim 1, wherein in response to the checked state that a state of charge of the auxiliary battery is a lower limit reference value or less, the power controller connects the first power supply and the second power supply to each other and controls the plurality of switches so that the power of the first power supply is supplied to the second power supply.

4. The apparatus according to claim 1, wherein in response to the checked state that an operation state of the main battery confirms a fault occurring in the main battery, the power controller separates the first power supply from the first load and the second load and controls the plurality of switches so that the power of the first power supply is blocked from being supplied to the first load and the second load.

5. The apparatus according to claim 1, wherein the power controller checks an option setting state of the second load, and controls the plurality of switches so that the power supplied to the second load is blocked according to the option setting state of the second load.

6. The apparatus according to claim 1, wherein the plurality of switches are disposed in a bridge or ring form in which the respective switches are arranged side by side.

7. The apparatus according to claim 1, wherein the second load is a load from which a voltage drop or a ripple occurs according to the state of the vehicle, among one or more loads included in the vehicle, and
the first load is a load except for the second load among the one or more loads included in the vehicle.

8. An apparatus for controlling power of a vehicle, the apparatus comprising:
a first load and a second load;
a first power supply supplying power to at least one of the first load and the second load from a main battery;
a second power supply supplying power to at least one of the first load and the second load from an auxiliary battery supplied with and charged by the power from the main battery;
a switch set including a plurality of switches intermitting lines between the first load, the second load, the first power supply, and the second power supply; and
a power controller checking a state of the vehicle and controlling a turn-on or a turn-off for the plurality of switches in response to the checked state of the vehicle,
wherein in response to the checked state that an engine state of the vehicle is an engine cranking state, the power controller separates the first power supply and the second power supply from each other and controls the switches so that the power of the first power supply is supplied to the second load and the power of the second power supply is supplied to the first load.

9. A method for controlling power of a vehicle, the method comprising:
checking a state of the vehicle; and
controlling a turn-on or a turn-off for a plurality of switches intermitting lines between a first power supply supplying power to at least one of a first load and a second load from the first load, the second load, and a main battery in response to the checked state of the vehicle, and a second power supply supplying power to at least one of the first load and the second load from an auxiliary battery supplied with and charged by the power from the main battery,
wherein the controlling of the turn-on or the turn-off for the plurality of switches includes:
when a fault occurs in the auxiliary battery, separating the second power supply from the first load and the second load, and controlling the plurality of switches so that the power of the second power supply is blocked from being supplied to the first load and the second load.

10. The method according to claim 9, wherein the controlling of the turn-on or the turn-off for the plurality of switches includes:
checking one or more of an engine cranking state of the vehicle, a state of charge of the auxiliary battery, a fault state of the main battery and the auxiliary battery, and an option state of the second load.

11. The method according to claim 10, wherein when the engine cranking state of the vehicle is checked, the controlling of the turn-on or the turn-off for the plurality of switches includes:
separating the first power supply and the second power supply from each other, and controlling the switches so that the power of the first power supply is supplied to the second load and the power of the second power supply is supplied to the first load.

12. The method according to claim 10, wherein when the state of charge of the auxiliary battery is an upper limit reference value or more, the controlling of the turn-on or the turn-off for the plurality of switches includes:
separating the second power supply from the first power supply, and controlling the plurality of switches so that the power of the first power supply is not supplied to the second power supply.

13. The method according to claim 10, wherein when the state of charge of the auxiliary battery is a lower limit reference value or less, the controlling of the turn-on or the turn-off for the plurality of switches includes:
connecting the first power supply and the second power supply to each other, and controlling the plurality of switches so that the power of the first power supply is supplied to the second power supply.

14. The method according to claim 10, wherein when an operation state of the main batter is checked, and a fault occurs in the main battery, the controlling of the turn-on or the turn-off for the plurality of switches includes:
separating the first power supply from the first load and the second load, and controlling the plurality of switches so that the power of the first power supply is blocked from being supplied to the first load and the second load.

15. The method according to claim 10, wherein the controlling of the turn-on or the turn-off for the plurality of switches includes checking an option setting state of the second load and controlling the plurality of switches so that the power supplied to the second load is blocked according to the option setting state of the second load.

\* \* \* \* \*